3,491,077
FILM TREATMENT
Donald E. Mixon and Don R. Hefner, Bartlesville, Okla., assignors to Phillips Petroleum Company, a corporation of Delaware
No Drawing. Filed Sept. 27, 1965, Ser. No. 490,640
Int. Cl. C08f 47/14
U.S. Cl. 260—93.7                    8 Claims

ABSTRACT OF THE DISCLOSURE

Improved clarity of plastic film is obtained by coating the film with a liquid polar compound prior to the film being cooled by contact with mechanical chilling apparatus.

---

This invention relates to a method for clarifying plastic film and the product thereof.

Heretofore in the production of certain plastic films such as polypropylene film it has been extremely difficult in most cases and substantially impossible in other cases to obtain good gloss and clarity when the thickness of the film exceeded 1 to 2 mils and the as formed film was cooled by contact with mechanical chill rolls.

It has now been found that plastic films of good gloss and substantially improved clarity are formed when at least one side of the film, as it is formed, is coated with a substantially liquid polar compound prior to the film being cooled by contact with mechanical chilling apparatus.

The product of this invention then is a plastic film of good gloss and improved clarity, as determined by ASTM D1003–61, over the same film when not treated by a polar compound.

Accordingly, it is an object of this invention to provide a new and improved method for making a plastic film of improved clarity. It is another object of this invention to provide a plastic film of improved clarity and good gloss.

Other aspects, objects and the several advantages of this invention will be readily apparent to those skilled in the art from the description and the appended claims.

According to this invention there is provided a method for improving the clarity of a plastic film formed from homopolymers or copolymers or mixtures thereof of at least one 1-olefin having from 2 to 8 carbon atoms per molecule, inclusive, which comprises coating at least one side of the film shortly after it is formed with a substantially liquid polar compound prior to cooling of the as formed film with conventional mechanical cooling devices such as chill rolls and the like. The polar compound employed should be substantially liquid at about 20° C. By polar compound it is meant a compound that has a finite dipole moment greater than zero Debye units.

The polymers applicable to this invention can be prepared in any conventional manner well known to those skilled in the art. A particularly desirable method is that disclosed in U.S. Patent 2,825,721. The films applicable to this invention can also be formed in any conventional manner such as by extruding, casting, flattening blown tubing, and the like.

The thickness of the films employed in this invention can vary widely but will generally be at least 1, preferably at least 2 mils. Very clear film can be obtained in a thickness range of from about 1 to about 20, preferably from about 1 to about 12, mils.

The polar compounds applicable to this invention can vary widely but generally are those compounds, preferably water or organic compounds, which have an unsymmetrical molecule so that the centers of positive and negative charge in the molecule do not substantially coincide and the molecule has a positive and a negative end, i.e. is an electrical dipole. A compound can be rendered unsymmetrical by the addition of unlike atoms such as oxygen to a hydrocarbon or by the use of substituents such as the addition of a methyl radical to a benzene ring. Generally, applicable polar compounds include organic alcohols, ketones or aldehydes; organic thiols; carboxylic acids; organic sulfides; organic phosphides, phosphites or phosphates; and organic cyanides, nitrates, or nitrites. Preferred polar compounds include water, monohydric alcohols containing from 1 to 10, preferably 1 to 6, carbon atoms per molecule, ketones containing from 3 to 10, preferably 3 to 6, carbon atoms per molecule, aldehydes containing from 2 to 10, preferably 2 to 6, carbon atoms per molecule, and hydrocarbon, preferably alkyl, substituted benzene containing from 7 to 12, preferably 7 to 10, carbon atoms per molecule, all carbon atom ranges being inclusive.

Representative examples of suitable polar compounds include methyl alcohol, isopropyl alcohol, n-hexyl alcohol, nonyl alcohol, decyl alcohol, acetone, methyl ethyl ketone, isopropyl ketone, di-n-butyl ketone, methyl-n-butyl ketone, di-n-butyl ketone, acetaldehyde, isobutyraldehyde, heptaldehyde, toluene, isopropylbenzene, triethylbenzene, and the like.

The polar compound can be applied to the film as it is formed in any conventional manner. Generally the desired result is that the side or sides of the film have a coating of the polar compound present between the interface of the film and the cooling apparatus used to cool the as formed film. For example, if the film passes over a chill roll after it is formed the chill roll itself can be coated with the polar compound by rubbing same with a cloth saturated with the polar compound so that the chill roll then uniformly applies the polar compound to the film. The polar compound can be applied to the film before it contacts the chill rolls or to the associated cooling apparatus such as chill rolls via brushing, spraying, dipping, rubbing with a saturated cloth, and the like. When the film is coated on both sides with the polar compound thicker films can readily be clarified, e.g. a film having a thickness of 20 mils will be better clarified if coated on both sides when compared to a film coated on only one side.

EXAMPLE

Polypropylene having a melt flow of 5 (ASTM 1238–57T, Condition L, 230° C.) and a density of 0.905 gram per cubic centimeter (ASTM D1505–60T) was extruded at a thickness of 7 mils through a 2½-inch extruder with a cast film slot die. The extruder was run at a stock temperature of 505° F. and at a screw speed of 40 revolutions per minute.

A pair of conventional chill rolls were spaced with the top roll 1½ inches from the die of the extruder. The top chill roll was maintained at a temperature of 62° F. and the bottom chill roll was maintained at a temperature of 64° F. The extruded film passed from the die around the chill rolls. A large number of materials were applied to the top chill roll with a wick-type applicator. The results were as follows:

| | Haze, Percent, ASTM D1003–61 |
|---|---|
| Control | 31 |
| Methyl alcohol | 2 |
| Ethyl alcohol | 2.3 |
| Isopropyl alcohol | 3 |
| Sec-butyl alcohol | 3 |
| Glycerol | 11 |
| Acetone [1] | 3 |
| Methyl ethyl ketone | 3.5 |
| Toluene | 8 |
| Water | 5.5 |
| Water plus 0.5 wt. percent alkyl phenoxy poly(ethyleneoxy)ethanol (Igepal CO 630) | 7 |
| Cyclohexane | 29 |
| Stoddard solvent [2] | 52 |

[1] Measured at clear spots with acetone having been applied on chill roll ¼-inch from film.
[2] A straight run naphtha obtained from paraffin base or mixed base crude and comprising primarily mixtures of paraffins boiling from 300 to 400° F. The high paraffin content of Stoddard solvent renders the material substantially non-polar.

It can be seen from the above data that when polar compounds are employed the haze percentage was very substantially reduced from the control value but when non-polar compounds such as cyclohexane and Stoddard solvent were employed little or no improvement in haze was effected.

Reasonable variations and modifications are possible within the scope of this disclosure without departing from the spirit and scope thereof.

We claim:

1. A method for improving the clarity of a film formed from a polymer of at least one olefin having from 2 to 8 carbon atoms per molecule, inclusive, which film is cooled by contact with mechanical cooling means, comprising interposing between at least one side of the film as it is formed and said cooling means a layer of substantially liquid polar compound selected from the group consisting of monohydric alcohols having from 1 to 10 carbon atoms per molecule, ketones having from 3 to 10 carbon atoms per molecule, aldehydes having from 2 to 10 carbon atoms per molecule.

2. The method according to claim 1 wherein said film has a thickness of at least 1 mil.

3. A method for improving the clarity of a film formed from a polymer of at least one olefin having from 2 to 8 carbon atoms per molecule, inclusive, which film is cooled by contact with mechanical cooling means, comprising coating at least one side of the film shortly after it has been formed by interposing between said film and said cooling means a substantially liquid polar compound selected from the group consisting of methyl alcohol, ethyl alcohol, isopropyl alcohol, secondary butyl alcohol, acetone, and methyl ethyl ketone.

4. The method according to claim 3 wherein said film is polypropylene.

5. The method according to claim 3 wherein said film is polyethylene.

6. The method according to claim 3 wherein said polar compound is applied to said cooling means associated with the processing of the as formed film and which thereby provides a coating of the polar compound in the interface between the cooling apparatus and the film.

7. The method according to claim 3 wherein said polar compound is applied to the as formed film before it contacts said cooling means.

8. A method for improving the clarity of polypropylene film which film is cooled after extrusion through a slot die by contact thereof with at least one rotating chill roll, comprising applying to at least one said chill roll at least one polar compound selected from the group consisting of monohydric alcohols containing from 1 to 6 carbon atoms per molecule, inclusive, and ketones containing from 3 to 6 carbon atoms per molecule, inclusive, said polar compound being applied in an amount sufficient to provide a substantially continuous layer of polar compound in the interface between said at least one chill roll and said film.

References Cited

UNITED STATES PATENTS

| 3,090,076 | 5/1963 | Corbett | 264—237 |
| 3,194,863 | 7/1965 | Williams et al. | 264—88 |

JOSEPH L. SCHOFER, Primary Examiner

S. M. LEVIN, Assistant Examiner

U.S. Cl. X.R.

260—94.9, 88.2, 897